United States Patent [19]
Lamm et al.

[11] Patent Number: 5,700,112
[45] Date of Patent: Dec. 23, 1997

[54] PNEUMATIC BLOW-OFF SYSTEM AND METHOD OF OPERATION THEREOF

[75] Inventors: Richard M. Lamm, Johnstown, Pa.; Ronald Lefebvre, Hove, Belgium

[73] Assignee: Gary A. Poborsky, Johnstown, Pa.

[21] Appl. No.: 640,329

[22] Filed: Apr. 30, 1996

[51] Int. Cl.⁶ .................................................. B65G 53/28
[52] U.S. Cl. ........................... 406/93; 406/39; 406/124
[58] Field of Search .......................... 406/39, 93, 124, 406/137, 144, 194

[56] References Cited

U.S. PATENT DOCUMENTS

| | | | |
|---|---|---|---|
| 2,795,403 | 6/1957 | Mead | 366/107 |
| 3,326,496 | 6/1967 | Auberson | 104/138.1 |
| 4,097,092 | 6/1978 | Lapple | 406/93 |
| 4,451,184 | 5/1984 | Mitchell | 406/105 |

FOREIGN PATENT DOCUMENTS

| | | | |
|---|---|---|---|
| 1293862 | 4/1962 | France | 406/122 |
| 320391 | 10/1929 | United Kingdom | 406/144 |
| 2168759 | 6/1986 | United Kingdom . | |

*Primary Examiner*—Andrew C. Pike
*Attorney, Agent, or Firm*—Banner & Witcoff, Ltd.

[57] ABSTRACT

A pneumatic blow-off system includes a three-way valve having an inlet, a first outlet, and a second outlet. A primary air conduit is connected between the first outlet and a fluidizing bin and a mixing air conduit is connected between the primary air conduit and a mixing bin which is in fluid communication with the fluidizing bin. A discharge conduit connects the mixing bin and a venturi assembly. A secondary air conduit is connected between the second outlet of the three-way valve and the venturi assembly.

15 Claims, 2 Drawing Sheets

PNEUMATIC BLOW-OFF SYSTEM AND METHOD OF OPERATION THEREOF

BACKGROUND OF THE INVENTION

1. Field of the Invention

This invention relates generally to a tank truck for transporting refuse materials and, more particularly, to a pneumatic blow-off system and method of operation thereof for use in unloading material from a tank truck.

2. Description of the Prior Art

Vehicles for transporting liquid and/or solid refuse materials, for example, tank trucks, are well known in the art. These vehicles are often provided with a pneumatic suction system for sucking material into a tank carried on the vehicle and a pneumatic discharge system for removing material from the tank. The pneumatic discharge system is commonly known in the art as a "blow-off system".

Generally, a tank truck has a tank mounted on the chassis. The tank may be pivotally fastened to the rear of the chassis so that the front end of the tank which is adjacent to the cab may be raised by, for example, a hydraulic jack assembly, to tilt the tank to discharge material from the tank. The rear of the tank is generally closed by a cover or a tailgate which is pivotally fastened to the wall of the tank and which is opened to allow material to flow out of the tank when the front end of the tank is raised. Alternatively, the material can be unloaded from a tank by using a blow-off system.

When material is sucked into the tank, a suction hose is connected to the tank and to the suction side of a blower or vacuum assembly. The discharge side of the blower or vacuum assembly is typically connected to a discharge hose by means of a blow-off system located at the rear of the tank. The blow-off system will include a discharge bin connected to the tank. The discharge bin usually includes a fluidization chamber and a mixing chamber and when material is unloaded from the tank by means of the blow-off system, the material is supplied to the discharge bin and air from a blower or a vacuum assembly is directed into the blow-off system. The air is used to pneumatically push material out of the discharge bin into a discharge pipe and move the material outwardly through the discharge hose.

An example of a prior art blow-off system is shown in British Patent Application No. GB 2 168 759A to Naaktgeboren. The Naaktgeboren application discloses a tank truck with a blow-off system attached to the rear of the truck. The Naaktgeboren blow-off system includes a complex, multi-baffled fluidization and discharge bin through which the material passes before being discharged from the discharge hose. The blow-off system disclosed in the Naaktgeboren application also includes a mixer wherein air from the blower assembly is mixed with secondary air from the discharge bin to move the material out of the discharge hose.

A problem with a blow-off system such as that disclosed in the Naaktgeboren application is that the material being discharged from the tank frequently clogs the fluidization bin due to restricted flow through the complex baffle assembly. This requires frequent unclogging by the use of fluidizing air piped into the fluidization bin. Another disadvantage of prior an blow-off systems is that the air supplied to the distribution bin is used only to push material through the blow-off system.

SUMMARY OF THE INVENTION

It is an object of the invention to provide an improved blow-off system and a method of operation thereof having a less complex, easy to manufacture fluidizing bin which is not prone to clogging. It is a further object of the invention to improve the dependability and ease of unloading the tank by providing a blow-off system and method of operation thereof including a venturi assembly located downstream of the discharge bin so that material flowing through the blow-off system is subject not only to a pushing force of air flowing through the system but is also subject to a pulling force caused by the vacuum created at the venturi assembly.

The pneumatic blow-off system of the invention includes a three-way valve having an inlet, a first outlet, and a second outlet. A primary conduit is connected between the first outlet and a fluidizing bin. A first end of a mixing air conduit is connected to the primary conduit and a second end of the mixing air conduit is connected to a mixing bin in fluid communication with the fluidizing bin. A discharge conduit is connected to the mixing bin substantially opposite the mixing air conduit inlet and the distal end thereof is connected to a venturi assembly. A secondary conduit is connected to the second outlet of the three-way valve and the distal end thereof is also connected to the venturi assembly.

The method of operating the blow-off system of the invention includes the steps of supplying air to a primary conduit and to a secondary conduit. A first portion of the air from the primary conduit is directed into a mixing bin containing a material. A mixture of the first portion of air and material from the mixing bin is directed into a discharge conduit and the distal ends of the discharge conduit and the secondary conduit are arranged relative to each other to produce a venturi effect.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
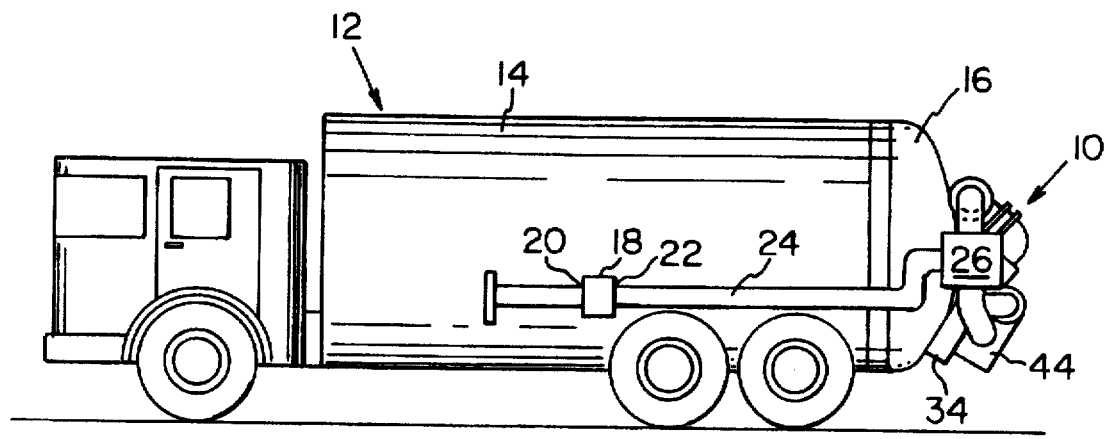
FIG. 1 is a side elevation of a tank truck with a blow-off system of the invention mounted thereon.
Figure 2:
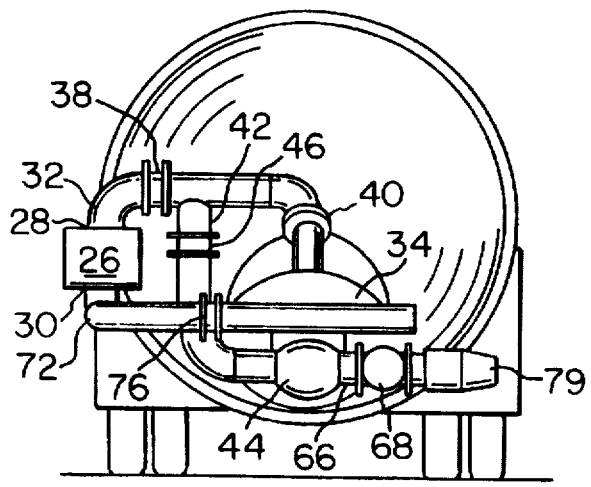
FIG. 2 is a rear elevation of a tank truck with a blow-off system of the invention mounted thereon.
Figure 3:
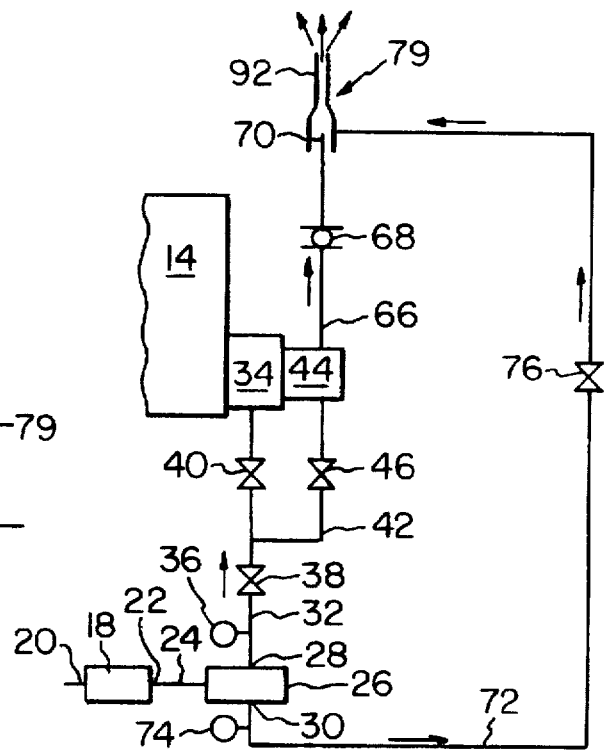
FIG. 3 is a schematic flow diagram of the blow-off system of the invention.
Figure 4:
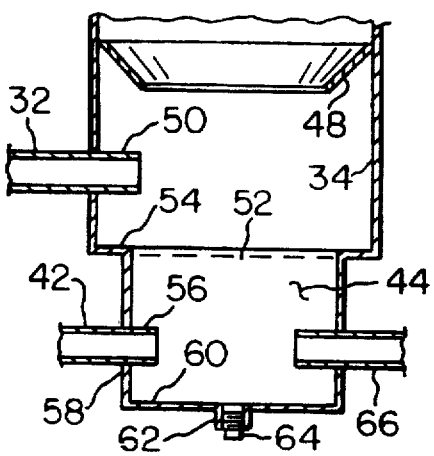
FIG. 4 is a vertical section of a fluidizing bin and a mixing bin of the blow-off system of the invention.

The blow-off system of the invention is shown in connection with a tank 14 in FIGS. 1–3 of the drawings. FIGS. 1–3 show a typical tank truck 12 having a preferably cylindrical tank 14 with a blow-off system 10 mounted on tank tailgate 16. Tank tailgate 16 is pivotally connected to the rear of the tank by means of a hinge (not shown) such as is well known to those skilled in the art. Truck 12 has a conventional vacuum or blower assembly 18 mounted on a side of tank 14 having a suction inlet side 20 and a discharge side 22. A supply conduit 24 extends between blower assembly 18 and a three-way valve 26 having a first air outlet 28 and a second air outlet 30. A primary air conduit 32 is connected to first air outlet 28 and extends between outlet 28 and a fluidizing bin 34 mounted on the tailgate of the tank. The primary air conduit 32 includes a pressure gauge 36 located adjacent to three-way valve 26 for measuring the fluid pressure in primary air conduit 32. A check valve 38 is located in primary air conduit 32 downstream of pressure gauge 36. A butterfly valve 40 is located in primary air conduit 32 between check valve 38 and fluidizing bin 34.

A mixing air conduit 42 branches off primary air conduit 32 between check valve 38 and butterfly valve 40. Mixing air conduit 42 extends between primary air conduit 32 and a mixing bin 44 and includes a butterfly valve 46.

As shown in FIGS. 2, 4, 6, and 7 of the drawings, fluidizing bin 34 preferably has a substantially cylindrical shape and is attached to tailgate 16. The interior of bin 34 is in flow communication with the interior of tank 14. A frustoconical annular ring 48 is disposed in the upper portion of the fluidizing bin 34. The distal end 50 of primary air conduit 32 passes through a sidewall of fluidizing bin 34 and extends into the interior thereof below the outlet of frustoconical annular ring 48. Fluidizing bin 34 also includes a connecting aperture 52 in bottom wall 54. Connecting aperture 52 is disposed directly above mixing bin 44 and connects the fluidizing bin 34 and the mixing bin 44.

Figure 7:
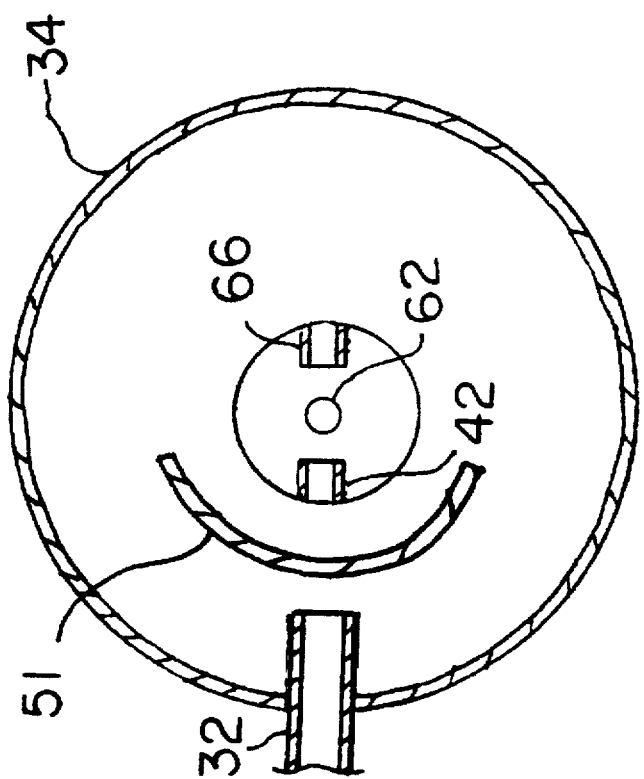
FIG. 7 is a top and cross-sectional view of a fluidizing bin taken along line 7—7 of FIG. 6.
Figure 6:
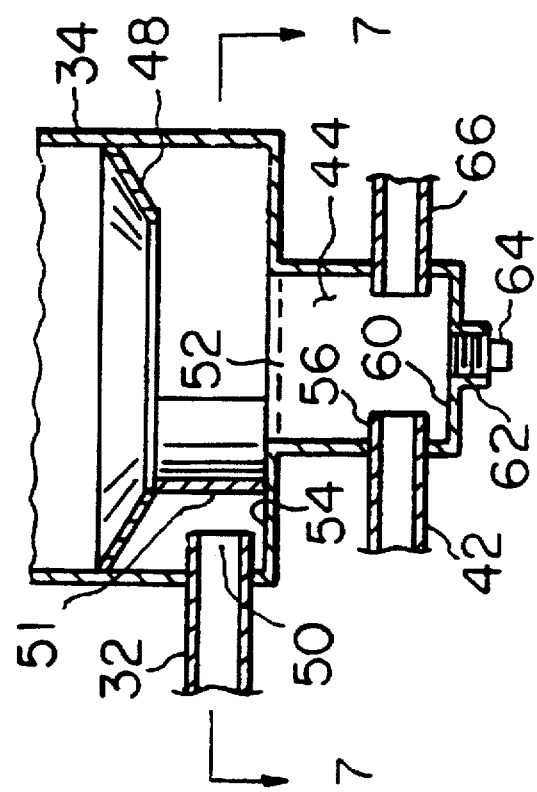
FIG. 6 is a vertical section of a fluidizing bin and a mixing bin according to a second embodiment of the invention.

In the embodiment shown in FIG. 6 and FIG. 7 of the drawings, a curved baffle 51 is located in fluidizing bin 34 opposite distal end 50 of primary air conduit 32. Baffle 51 extends from the bottom of annular ring 48 downwardly to the upper surface of bottom wall 54 adjacent to the edge of connecting aperture 52. Air passing through distal end 50 of primary air conduit 32 contacts the curved surface of baffle 51 which imparts a swirling motion to the air which maximizes the contact of air with material passing downwardly through ring 48. As shown in FIG. 7, baffle 51 may concentrically parallel the surfaces of mixing bin 34.

The distal end 56 of mixing air conduit 42 extends into mixing bin 44 through wall 58 thereof. Mixing bin 44 is preferably a substantially cylindrical metal bin. Bottom wall 60 of mixing bin 44 includes a drain outlet 62 with a threaded drain plug 64 disposed therein.

A discharge conduit 66 has an inlet end located in mixing bin 44 opposite distal end 56 of the mixing air conduit 42. As shown in FIG. 3, discharge conduit 66 includes a ball valve 68 located between mixing bin 44 and a distal end 70 of discharge conduit 66.

Figure 5:
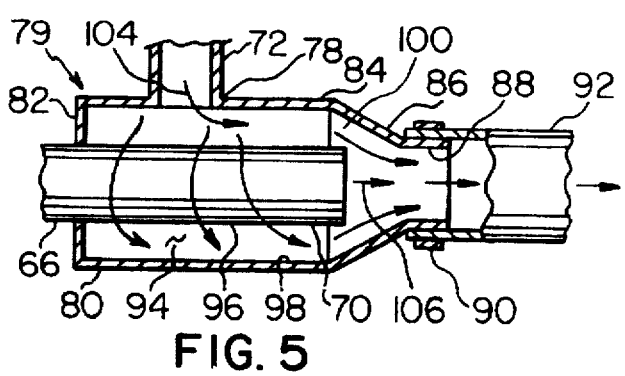
FIG. 5 is a vertical section of the venturi assembly of the invention.

A secondary air conduit 72 is attached to second outlet 30 of three-way valve 26. Secondary air conduit 72 includes a pressure gauge 74 adjacent to three-way valve 26 to measure the fluid pressure in the conduit. Secondary air conduit 72 also includes a butterfly valve 76 located downstream of pressure gauge 74. As shown in FIG. 5 of the drawings, the distal end 78 of secondary air conduit 72 is attached to a venturi assembly 79. Venturi assembly 79 includes an annular body 80 surrounding the distal end 70 of discharge conduit 66 and is in flow connection with distal end 78 of secondary air conduit 72. Annular body 80 is attached to distal end 70 of discharge conduit 66 by conventional means, such as welding or threads. Annular body 80 includes a substantially planar rear wall 82, a central cylindrical portion 84, a tapered front end portion 86, and an attachment collar 88. Collar 88 receives a connector 90 on the inlet end of a discharge hose 92. Attachment collar 88 and connector 90 can be secured by conventional means such as a bayonet connector or by threads. Annular body 80 is attached to distal end 70 of discharge conduit 66 such that an annular gap 94 is formed between an outer surface 96 of distal end 70 and an inner surface 98 of annular body 80. An annular flow gap 100 is formed between distal end 70 and inner surface 98 of annular body 80.

A preferred method of operating blow-off system 10 is described hereinafter. When tank 14 of tank truck 12 is to be unloaded through blow-off system 10, the material in tank 14 is directed by means known in the art toward fluidizing bin 34. The material flows downwardly by the force of gravity into fluidizing bin 34 through frustoconical annular ring 48 where it is contacted by the air stream passing from distal end 50 of conduit 32. The material then flows downwardly through connecting aperture 52 into mixing bin 44. Utilization of a single frustoconical annular ring 48 prevents material from clogging and blocking the flow through fluidizing bin 34, as was prevalent in the prior art arrangements. Additionally, the swirling motion of the air in the embodiment shown in FIG. 6 and FIG. 7 of the drawings assists in preventing clogging. In the initial valve alignment of blow-off system 10, butterfly valve 40 is closed, butterfly valve 46 is open, butterfly valve 76 is open, ball valve 68 is closed, and three-way valve 26 is directed toward second outlet 30.

Blower assembly 18 is activated and sends air through supply conduit 24 to three-way valve 26. With the above-described initial valve alignment, the air is directed through second outlet 30, secondary air conduit 72, and butterfly valve 76 into annular body 80. As shown in FIG. 5, this secondary air shown by arrow 104 flows out of distal end 78 of secondary air conduit 72 into annular gap 94 and swirls around distal end 70 of discharge conduit 66. Secondary air then flows through flow gap 100 into tapered portion 86 and into the inlet end of discharge hose 92. The flow of secondary air through flow gap 100 is indicated by arrows 106 and produces a venturi effect around distal end 70 of discharge conduit 66 forming a vacuum in discharge conduit 66 downstream of ball valve 68.

To start the discharge of material from tank 14, ball valve 68 is slowly opened and three-way valve 26 is directed to supply air through supply conduit 24 substantially evenly between first outlet 28 and second outlet 30. The vacuum created by venturi assembly 79 aids in establishing the initial flow of material out of mixing bin 44 and into discharge conduit 66. Air from first outlet 28 flows into primary air conduit 32, through check valve 38, into mixing air conduit 42, and through butterfly valve 46 into mixing bin 44. Material that has passed into mixing bin 44 through fluidizing bin 34 is thus moved into discharge conduit 66 by the pressure of the mixing air flowing through mixing air conduit 42 and, at the same time, the material is pulled into discharge conduit 66 by the vacuum produced in discharge conduit 66 by venturi assembly 79. As shown in FIG. 5 of the drawings, the combination of mixing air and material from mixing bin 44 flows out of distal end 70 of discharge conduit 66, and mixes with secondary air, arrow 104, before being funneled into the inlet end of discharge hose 92. The combination of the mixing air from primary air conduit 42 and the pulling effect of venturi assembly 79 substantially increases the speed and ease of discharging material from mixing bin 44 and hence from cylindrical tank 14.

If the flow of material from the discharge hose slows, butterfly valve 40 may be temporarily opened to supply fluidizing air through distal end 50 of primary air conduit 32 into fluidizing bin 34. This air fluidizes the material flowing into fluidizing bin 34 through frustoconical annular ring 48 and helps break apart any large clumps of material which may tend to clog fluidizing bin 34. After the compacted material has been cleared, butterfly valve 40 is again closed.

While preferred embodiments of the invention have been described in detail herein, it will be appreciated by those skilled in the art that various modifications and alternatives to the preferred embodiments may be developed in light of the overall teachings of the disclosure. Accordingly, the particular arrangements are illustrative only and are not limiting as to the scope of the invention which is to be given the full breadth of the appended claims and any and all equivalents thereof.

We claim:

1. A pneumatic blow-off system for a tank comprising:

a three-way valve having an inlet adapted to be in flow communication with a blower, a first outlet, and a second outlet;

a fluidizing bin adapted to be in flow connection with a tank and a mixing bin in flow connection with said fluidizing bin;

a primary air conduit having a first end connected to said first outlet of said three-way valve and a distal end connected to said fluidizing bin;

a mixing air conduit having a first end connected to said primary air conduit and a second end connected to said mixing bin;

a discharge conduit in flow communication with said mixing bin;

a venturi assembly;

a distal end of said discharge conduit being in flow communication with said venturi assembly; and a secondary air conduit in flow communication with said second outlet of said three-way valve and a distal end of said secondary air conduit connected to said venturi assembly;

wherein said fluidizing bin includes a semicylindrical baffle having a curved surface which curves away from said distal end of said primary air conduit, wherein air passing through said primary air conduit is directed against the curved surface which imparts a swirling motion thereto.

2. A blow-off system as set forth in claim 1, wherein said venturi assembly includes an annular body disposed around and spaced from said distal end of said discharge conduit to form an annular gap between an outer surface of said distal end of said discharge conduit and an inner surface of said annular body, wherein said distal end of said secondary air conduit is in flow communication with said annular gap.

3. A blow-off system as set forth in claim 2, wherein said annular body includes a substantially planar rear wall attached to said distal end of said discharge conduit, a central cylindrical portion, and a tapered front portion, and wherein said distal end of said secondary conduit extends into said central cylindrical portion.

4. A blow-off system as set forth in claim 1, further including a check valve located in said primary air conduit and a second valve disposed in said primary air conduit downstream of said check valve.

5. A blow-off system as set forth in claim 1, further including a valve located in said mixing air conduit.

6. A blow-off system as set forth in claim 1, further including a single, frustonconical annular ring disposed in an upper portion of said fluidizing bin.

7. A blow-off system as set forth in claim 1, further including a valve located in said discharge conduit.

8. A blow-off system as set forth in claim 1, further including a valve located in said secondary air conduit.

9. A blow-off system as set forth in claim 1, further including a blower assembly in flow communication with said inlet of said three-way valve.

10. A blow-off system as set forth in claim 9, further including a supply conduit extending between a discharge of said blower assembly and said inlet of said three-way valve.

11. The pneumatic blow-off system according to claim 1, wherein the curved surface of the semicylindrical baffle extends downwardly from a bottom of an annular ring disposed in an upper portion of the fluidizing bin to a bottom wall of the fluidizing bin.

12. The pneumatic blow-off system according to claim 1, wherein the curved surface of the semicylindrical baffle concentrically parallels a curved wall of the fluidizing bin.

13. A method of pneumatically discharging material from a tank having a blow-off system having a primary air conduit and a secondary air conduit, said method comprising the steps of:

supplying air to said primary air conduit and to said secondary air conduit in said blow-off system;

directing a first portion of said air from said primary air conduit into a mixing bin containing said material and against a semicylindrical baffle having a curved surface which curves away from a distal end of said primary air conduit contained in the mixing bin;

directing a mixture of said first portion of said air and said material from said mixing bin into a discharge conduit; and arranging a distal end of said discharge conduit and a distal end of said secondary air conduit to produce a venturi effect.

14. A pneumatic blow-off system including a primary air conduit and a secondary air conduit, and further comprising:

means for supplying air to said primary air conduit and said secondary air conduit;

a mixing bin adapted to be connected in flow communication with a tank to receive material from said tank;

means for directing a first portion of the air from said primary air conduit into said mixing bin containing a portion of said material and against a semicylindrical baffle having a curved surface which curves away from a distal end of the primary air conduit and causing said first portion of the air to be further mixed;

a discharge conduit;

means for directing a mixture of said first portion of air from said primary air conduit and said material from said mixing bin into said discharge conduit; and means for arranging a distal end of said discharge conduit and a distal end of said secondary air conduit to produce a venturi effect.

15. The pneumatic blow-off system according to claim 14, wherein the curved surface of the semicylindrical baffle is concentric with a curved wall of the mixing bin.

* * * * *